(12) United States Patent
Takayama

(10) Patent No.: US 11,169,252 B2
(45) Date of Patent: Nov. 9, 2021

(54) OBJECT DETECTION DEVICE

(71) Applicant: DENSO CORPORATION, Kariya (JP)

(72) Inventor: Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 288 days.

(21) Appl. No.: 16/323,876

(22) PCT Filed: Aug. 8, 2017

(86) PCT No.: PCT/JP2017/028804
§ 371 (c)(1),
(2) Date: Feb. 7, 2019

(87) PCT Pub. No.: WO2018/030419
PCT Pub. Date: Feb. 15, 2018

(65) Prior Publication Data
US 2019/0179002 A1    Jun. 13, 2019

(30) Foreign Application Priority Data

Aug. 10, 2016 (JP) .............................. JP2016-158101

(51) Int. Cl.
| | |
|---|---|
| *G01S 13/58* | (2006.01) |
| *G08G 1/16* | (2006.01) |
| *G01S 13/72* | (2006.01) |
| *G01S 13/93* | (2020.01) |
| *G01S 13/60* | (2006.01) |
| *G01S 13/931* | (2020.01) |

(52) U.S. Cl.
CPC .......... *G01S 13/588* (2013.01); *G01S 13/589* (2013.01); *G01S 13/60* (2013.01); *G01S 13/72* (2013.01); *G01S 13/723* (2013.01); *G01S 13/93* (2013.01); *G01S 13/931* (2013.01); *G08G 1/16* (2013.01)

(58) Field of Classification Search
CPC ...... G01S 13/588; G01S 13/589; G01S 13/72; G01S 13/93
See application file for complete search history.

(56) References Cited

U.S. PATENT DOCUMENTS

| | | | | |
|---|---|---|---|---|
| 9,809,219 | B2 * | 11/2017 | Agnew | ............... B60W 10/184 |
| 10,427,677 | B2 * | 10/2019 | Eisele | ................... B60W 30/08 |
| 10,431,099 | B2 * | 10/2019 | Stewart | ................ G01C 21/203 |
| 2008/0111730 | A1 | 5/2008 | Ding et al. | |

(Continued)

FOREIGN PATENT DOCUMENTS

JP    2008-014819 A    1/2008

*Primary Examiner* — Thomas M Hammond, III
(74) *Attorney, Agent, or Firm* — Maschoff Brennan

(57) ABSTRACT

A range setting unit sets, for each of tracked objects as objects being tracked, a connection range as a range in which the tracked object is estimated to be movable based on a state quantity of the tracked objects determined in the previous processing cycle. An association extraction unit extracts, for each of the tracked objects, a reflection point detected in the current processing cycle and positioned in the connection range as an associated reflection point. A state quantity update unit updates, for each of the tracked objects, the state quantity of the tracked objects in the current processing cycle, based on the previous state quantity and the state quantity of the associated reflection point.

7 Claims, 15 Drawing Sheets

(56) References Cited

U.S. PATENT DOCUMENTS

| | | | |
|---|---|---|---|
| 2009/0192710 A1* | 7/2009 | Eidehall | B60W 50/0097 |
| | | | 701/301 |
| 2011/0295549 A1* | 12/2011 | Takabayashi | G01S 7/4004 |
| | | | 702/142 |
| 2014/0012492 A1* | 1/2014 | Bowers | G08G 1/16 |
| | | | 701/301 |
| 2014/0037138 A1* | 2/2014 | Sato | G06K 9/00805 |
| | | | 382/103 |
| 2016/0375903 A1* | 12/2016 | Minemura | B60Q 9/008 |
| | | | 701/70 |
| 2018/0095103 A1* | 4/2018 | Hirai | G01P 3/64 |

* cited by examiner

OBJECT DETECTION DEVICE

CROSS-REFERENCE TO RELATED APPLICATION

This application is the U.S. national phase of International Application No. PCT/JP2017/028804 filed Aug. 8, 2017 which designated the U.S. and claims priority to Japanese Patent Application No. 2016-158101 filed Aug. 10, 2016, the contents of which are incorporated herein by reference.

TECHNICAL FIELD

The present disclosure relates to a technique for detecting an object from the results of detection by a vehicle-mounted radar.

BACKGROUND ART

To detect an object varying in position relative to a subject vehicle by a vehicle-mounted radar, tracking is performed to determine the continuity of results of detection in individual processing cycles. In the tracking, the position of an object in the current cycle is predicted from the position and velocity of the object detected in the previous processing cycle (hereinafter, called previous object), and a connection range as a range in which the object will be possibly detected is set centered on the predicted position. In addition, if an object candidate detected in the current processing cycle falls within the connection range, it is determined that there is continuity between the object candidate within the connection range and the previous object as the source of the connection range. Further, information on the previous object and the object candidate within the connection range is used to determine the position and velocity of the object in the current cycle.

In this type of device, an object as a target of tracking is conventionally assumed to be low in lateral velocity as a velocity along the direction of width of the subject vehicle, such as a vehicle running in the same direction as the subject vehicle or a stationary object on a road side. Based on this, the connection range is set to be wide in the longitudinal direction and narrow in the lateral direction. Accordingly, in the case where the object as a target of tracking is a preceding vehicle, for example, when the amount of movement of the preceding vehicle in the lateral direction becomes large because the precedent vehicle is approaching a curve in the road or the like, the point of reflection from the preceding vehicle detected by the vehicle-mounted radar may come out of the connection range. To suppress such a situation, PTL 1 discloses a technique for widening the connection range when it is estimated that the object as a target of tracking is approaching a curve in the road.

CITATION LIST

Patent Literature

[PTL 1] US Patent Application No. 2008/0111730

SUMMARY OF THE INVENTION

The velocity of an object observed by a vehicle-mounted radar is a velocity in a range direction in which the object is moving toward the subject vehicle. Accordingly, the velocity in the longitudinal direction and the velocity in the lateral direction (hereinafter, called velocity vector) need to be estimated by filtering. Since the object as a target of tracking has a low velocity in the lateral direction in many cases as described above, it is generally estimated that the velocity vector at the time of initial detection has only a velocity in the longitudinal direction.

However, the inventor's detailed study has discovered an issue that an object at a high lateral velocity such as a bicycle crossing a road falls outside the connection range and cannot be tracked because there is a great gap between the position of the object predicted based on the results of detection in the previous cycle and the position of the object actually observed in the current cycle.

One aspect of the present disclosure is desirably to provide a technique for improving the detection accuracy of an object moving in the lateral direction.

An object detection device in one aspect of the present disclosure includes a range setting unit, an association extraction unit, and a state quantity update unit, and determines a state quantity of at least one or more objects having reflected a radar wave in each preset processing cycle, based on the state quantity indicating one of the position and velocity of a reflection point of the radar wave.

The range setting unit sets, for each of at least one or more tracked objects as objects being tracked, a connection range as a range in which the tracked object is estimated to be movable based on a previous state quantity as a state quantity of the individual tracked object determined in the previous processing cycle. The association extraction unit extracts, for each of the at least one or more tracked objects, a reflection point that is detected in the current processing cycle and falls within a connection range set by the range setting unit, as an associated reflection point. The state quantity update unit updates, for each of the at least one or more tracked objects, the state quantity of the at least one or more tracked objects in the current processing cycle based on the previous state quantity and the state quantity of the associated reflection point extracted by the association extraction unit. The range setting unit determines whether a positional condition is satisfied for each of the at least one or more tracked objects. When determining that the positional condition is satisfied, the range setting unit extends the connection range as compared to when determining that the positional condition is not satisfied. However, the positional condition is that the at least one or more tracked objects fall within a specified positional range. The specified positional range is a range in which a pre-specified target object is estimated to collide with the subject vehicle when the object moves in a lateral direction as a direction along the width of the subject vehicle at a velocity within a possible velocity range of the target object. The subject vehicle is a vehicle equipped with the object detection device.

According to this configuration, the connection range of an object satisfying the positional condition is extended in the lateral direction, for an object in a position where, if the object is the target object, the object will possibly collide with the subject vehicle. Accordingly, it is possible to improve the accuracy of tracking the target object as the tracked object moving in the lateral direction. As for an object not satisfying the positional condition, the object will not collide with the subject vehicle even if the object is the target object moving in the lateral direction. Accordingly, the use of a conventional connection range allows accurate tracking of an object moving at a low lateral velocity.

DESCRIPTION OF EMBODIMENTS

Embodiments of the present disclosure will be described below with reference to the drawings.

1. First Embodiment

[1-1. Configuration]

Figure 1:
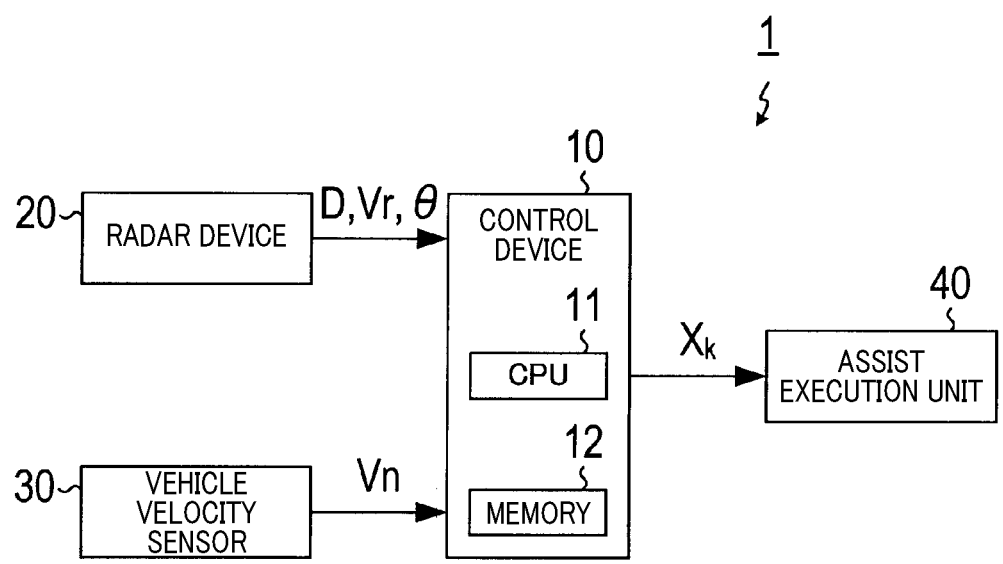
FIG. 1 is a block diagram illustrating a configuration of a driving assist system.

A driving assist system 1 illustrated in FIG. 1 is mounted in a vehicle such as four-wheeled automobile that includes a control device 10. The driving assist system 1 may include a radar device 20, a vehicle velocity sensor 30, and an assist execution unit 40. Hereinafter, the vehicle equipped with the driving assist system 1 will also be called a subject vehicle.

The radar device 20 is disposed such that a preset angular range in front of the subject vehicle is a search range. The radar device 20 emits a radio wave in a millimeter wave band as a radar wave and receives a reflection wave of the radio wave, and based on the received signal, generates observation information on a reflection point where the radar wave was reflected. The observation information includes at least a distance D from the subject vehicle to the reflection point, a relative velocity Vr of the reflection point to the subject vehicle, and an azimuth angle θ that is an azimuth direction as a direction of the reflection wave traveling toward the subject vehicle indicated by an angle with respect to the traveling direction of the subject vehicle. The relative velocity Vr is a velocity in a radial direction centered on the subject vehicle.

The vehicle velocity sensor 30 detects a subject vehicle velocity Vn as a velocity of the subject vehicle.

The assist execution unit 40 includes at least one of various vehicle-mounted devices other than the control device 10, for example, actuator, audio device, and display device. The assist execution unit 40 executes various driving assists including control of behavior of the subject vehicle or notifications to the driver, based on object information indicating object state quantity generated by the control device 10.

The control device 10 includes a microcomputer that has a CPU 11 and a semiconductor memory such as RAM or ROM (hereinafter, called memory 12). The functions of the control device 10 are implemented by the control device 10 executing programs stored in a non-transitory tangible recording medium. In this example, the memory 12 is equivalent to the non-transitory tangible recording medium storing the programs. When any of the programs is executed, the method corresponding to the program is executed. The control device 10 may include one or more microcomputers. The control device 10 is equivalent to an object detection device.

The control device 10 implements at least a tracking process by the CPU 11 executing the program. The memory 12 stores at least the program for the tracking process and data prescribing a positional condition and a velocity condition for use in the detection of an object that will possibly collide with the subject vehicle.

The method for performing the functions of the components included in the control device 10 is not limited to software. Some or all of the functions may be performed by one or more units of hardware. For example, when the foregoing functions are to be performed by an electronic circuit as hardware, the electronic circuit may be implemented by a digital circuit, an analog circuit, or a combination of them.

[1-2. Positional Condition]

A specified position range as data prescribing the positional condition will be described.

The specified position range refers to a position range in which, when a bicycle moving in a direction of crossing over the road in which the subject vehicle is running (that is, lateral direction) is designated as a crossing bicycle, there exists a crossing bicycle that will possibly collide with the subject vehicle within a predetermined time.

Figure 2:
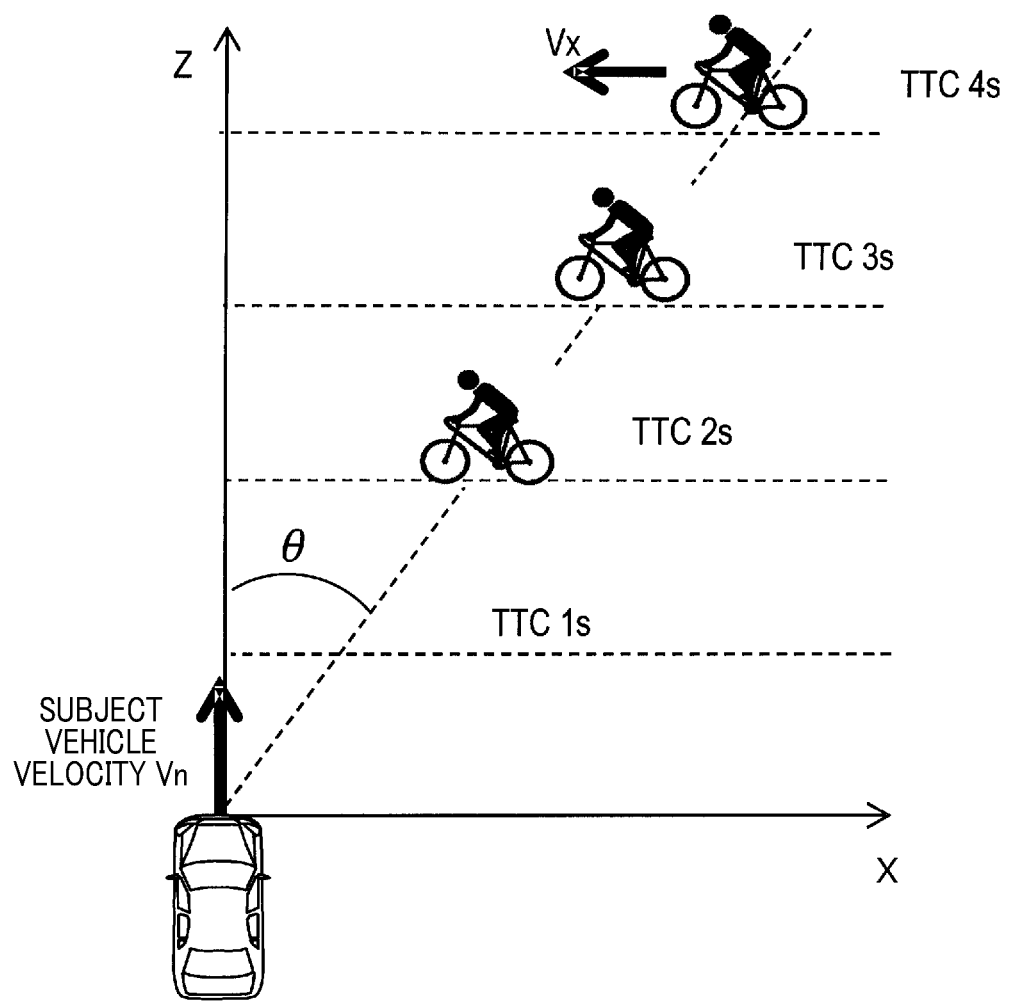
FIG. 2 is a diagram illustrating the relationship between a crossing bicycle and a subject vehicle.

As illustrated in FIG. 2, when the lateral velocity of the crossing bicycle (that is, the velocity in the lateral direction) is designated as Vx, plotting spots where the time-to-collide (that is, TTC) with a vehicle running on a Z axis at a velocity Vn is one second, two seconds, three seconds, . . . makes it possible to draw a straight line with an inclination of an angle θ with respect to the Z axis.

Figure 3:
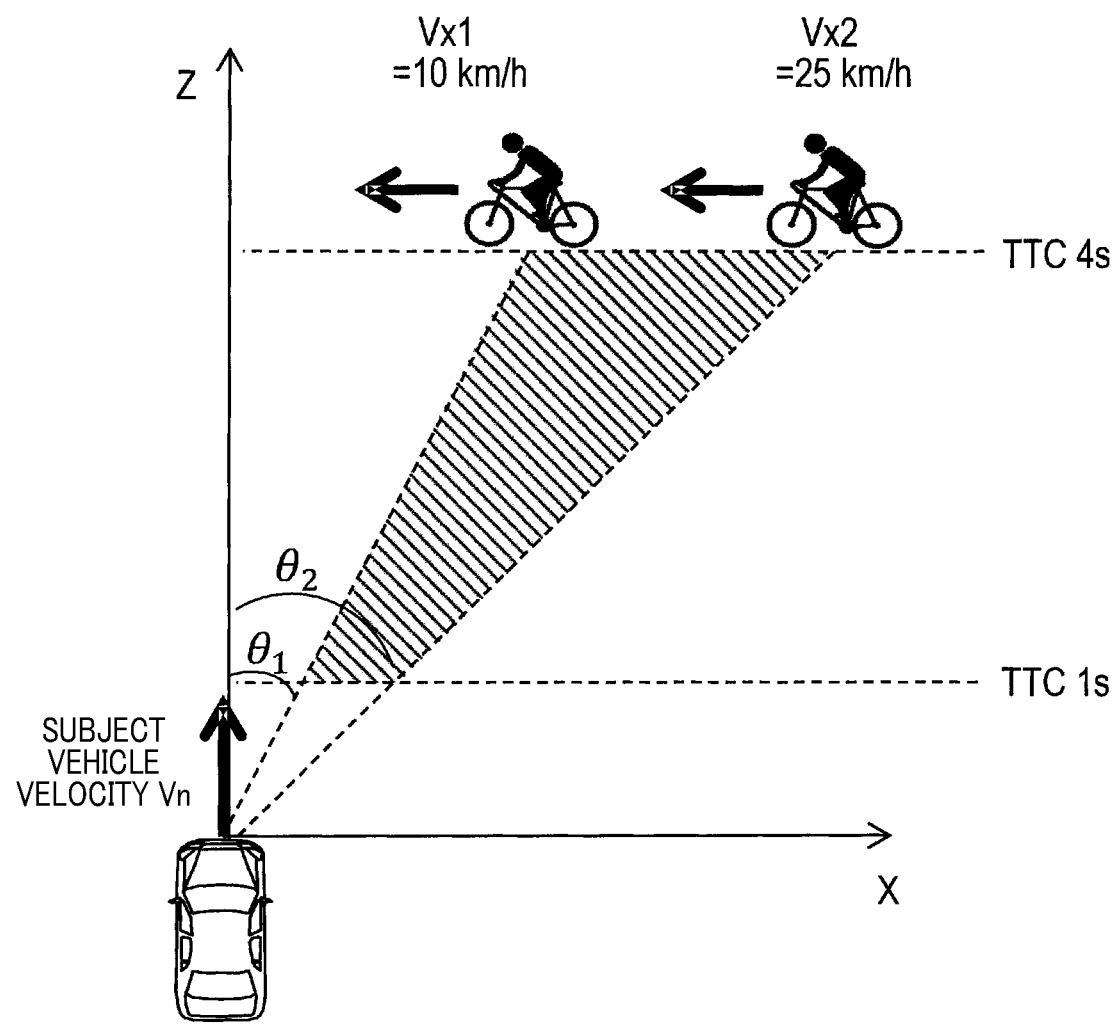
FIG. 3 is a diagram illustrating specific contents of a positional condition.

In this example, the lower limit of the lateral velocity Vx preset to the crossing bicycle is designated as lower limit velocity Vx1 and the upper limit of the lateral velocity Vx as upper limit velocity Vx2. As illustrated in FIG. 3, a straight line of an angle θ1 determined by the lower limit velocity Vx1 and a straight line of an angle θ2 determined by the upper limit velocity Vx2 can be obtained. The angle θ1 can be determined by Equation (1) and the angle θ2 can be determined by Equation (2) as follows:

[Math. 1]

$$\theta1 = \arctan(Vx1/Vn) \quad (1)$$

$$\theta2 = \arctan(Vx2/Vn) \quad (2)$$

The crossing bicycle existing within the range sandwiched between the two straight lines, that is, existing within the range of the angles θ1 to θ2 as seen from the subject vehicle will possibly collide with the subject vehicle. The lower limit velocity Vx1 can be set to the upper limit of the lateral velocity Vx at which an object can be tracked within a general connection range described later, for example, Vx1=10 km/h. The upper limit velocity Vx2 can be set to a velocity at which it is considered that there is almost no crossing bicycle running at a lateral velocity Vx higher than the upper limit velocity Vx2, for example, Vx2=25 km/h.

The range of the angles θ1 to θ2 may be used as the specified position range. In this example, however, the range in which TTC is 1 s to 4 s, that is, the region hatched by diagonal lines in the drawing, is set to the specified position range, not including a region sufficiently distant from the subject vehicle and a region too close to the subject vehicle.

[1-3. Velocity Condition]

A specified velocity range as data prescribing the velocity condition will be described.

Figure 4:
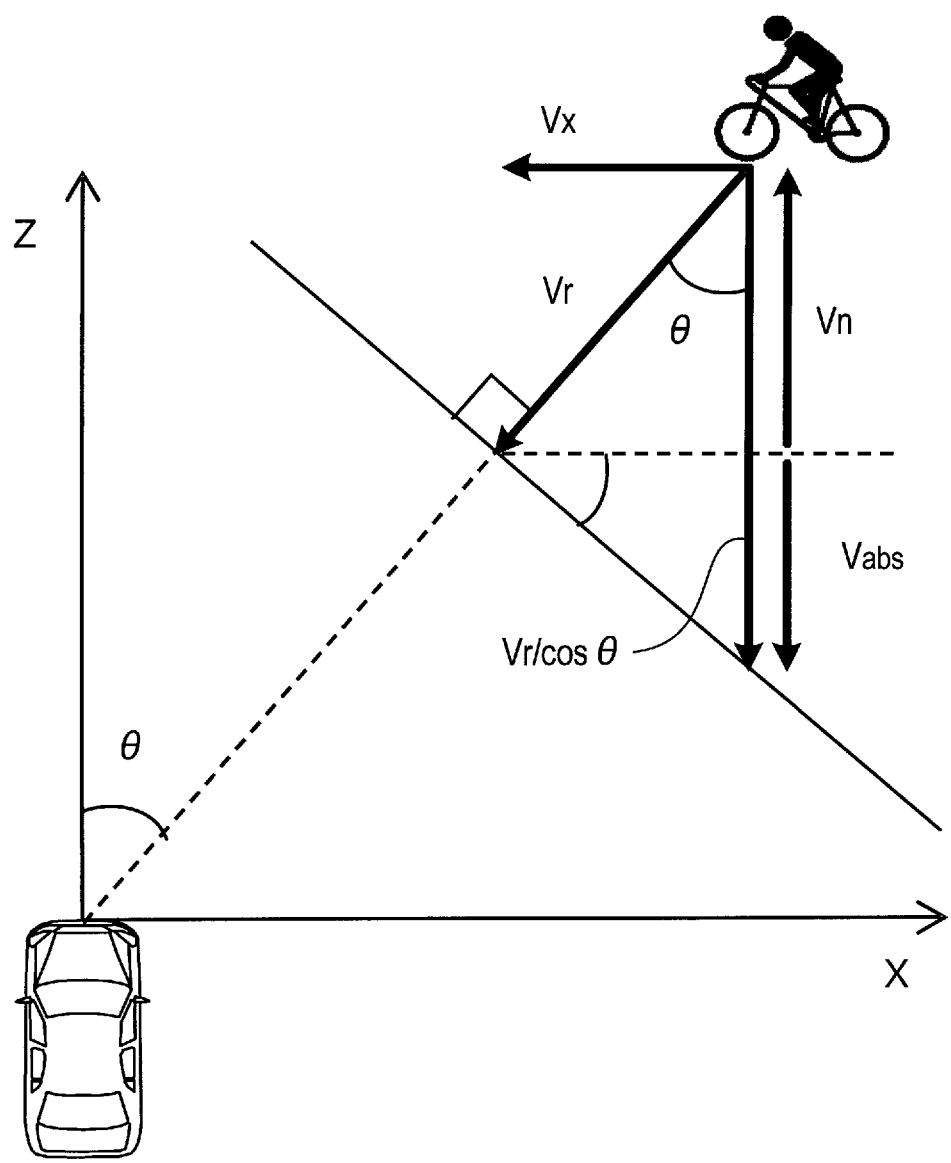
FIG. 4 is a diagram illustrating the relationships among range velocity, ground velocity, subject vehicle velocity, and crossing velocity.

The specified velocity range is a range of a ground velocity Vabs that can be made by an object as a crossing bicycle. The ground velocity Vabs indicates a vehicle traveling velocity in a ground coordinate system of the object, which is calculated by adding the subject vehicle velocity to a longitudinal relative velocity of the object in the vehicle direction as state quantity (that is, the velocity along the traveling direction of the subject vehicle). The ground velocity Vabs at the time of initial detection is obtained by adding the subject vehicle velocity Vn to the longitudinal relative velocity Vz of the object determined on the assumption that the lateral velocity Vx of the object is 0 as illustrated in FIG. 4, which is expressed by Equation (3) below. As can be seen in FIG. 4, the ground velocity Vabs, the lateral velocity Vx of the object, and the subject vehicle velocity Vn are in the relationship expressed by Equation (4) below. In this example, the ground velocity Vabs expressed in Equation (3) takes a value based on the assumption that Vx=0 at the time of initial detection, and when the lateral velocity Vx is correctly estimated by the tracking process, $VX_k$ converges on 0.

[Math. 2]

$$Vabs = Vn + \frac{Vr}{\cos\theta} \quad (3)$$

$$Vabs = -Vx \times \frac{Vx}{Vn} \quad (4)$$

Figure 5:
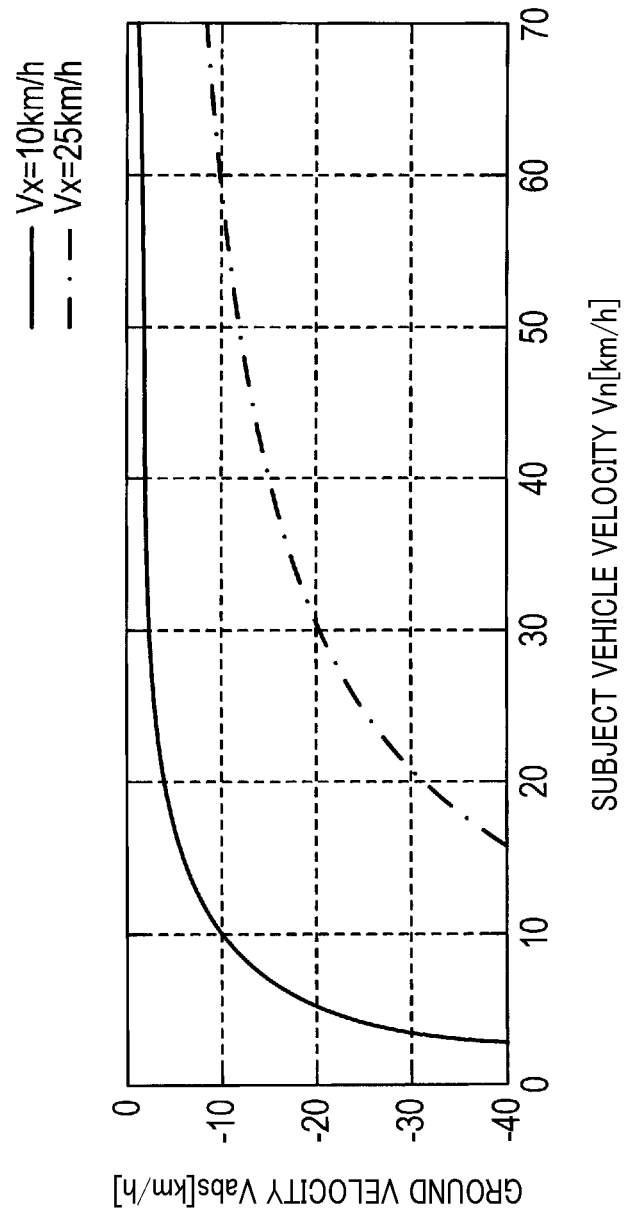
FIG. 5 is a diagram illustrating specific contents of a velocity condition.
Figure 6:
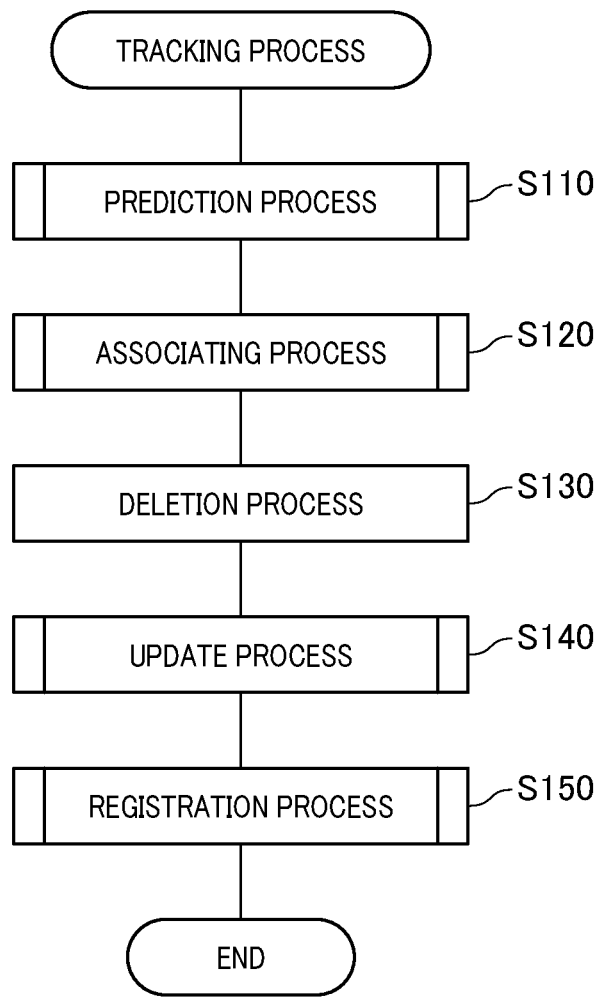
FIG. 6 is a flowchart of a tracking process.

FIG. 5 illustrates the results of the ground velocity Vabs determined using Equation (4) in the case where the lower limit velocity Vx1 of the crossing bicycle is 10 km/h and the upper limit velocity Vx2 of the crossing bicycle is 25 km/h within the range of the subject vehicle Vn of 0 to 70 km/h. The region sandwiched between the graph with Vx1 and the graph with Vx2 constitutes the specified velocity range. That is, the object at the ground velocity Vabs within the specified velocity range is likely to be a crossing bicycle.

[1-4. Processes]

The tracking process executed by the control device 10 will be described with reference to the flowcharts of FIGS. 6 to 10. The control device 10 repeatedly executes this process in each preset processing cycle. The repetition period of the processing cycle is designated as ΔT. In the following description, the object as a target of tracking by this process will be called a tracked object. The state quantity of the object includes the position and relative velocity of the object. The position of the object is expressed by lateral position x and longitudinal position z, and the relative velocity is expressed by lateral velocity Vx and longitudinal velocity Vz. In the following description, the vector defined by $X=[x, z, Vx, Vz]^T$ will be called the state vector.

In S110, for each of tracked objects, based on the estimated value of the state vector of the tracked object determined in the previous processing cycle (hereinafter, called previous estimated vector), the control device 10 executes a prediction process to determine the predicted value of the state vector in the current processing cycle.

Figure 7:
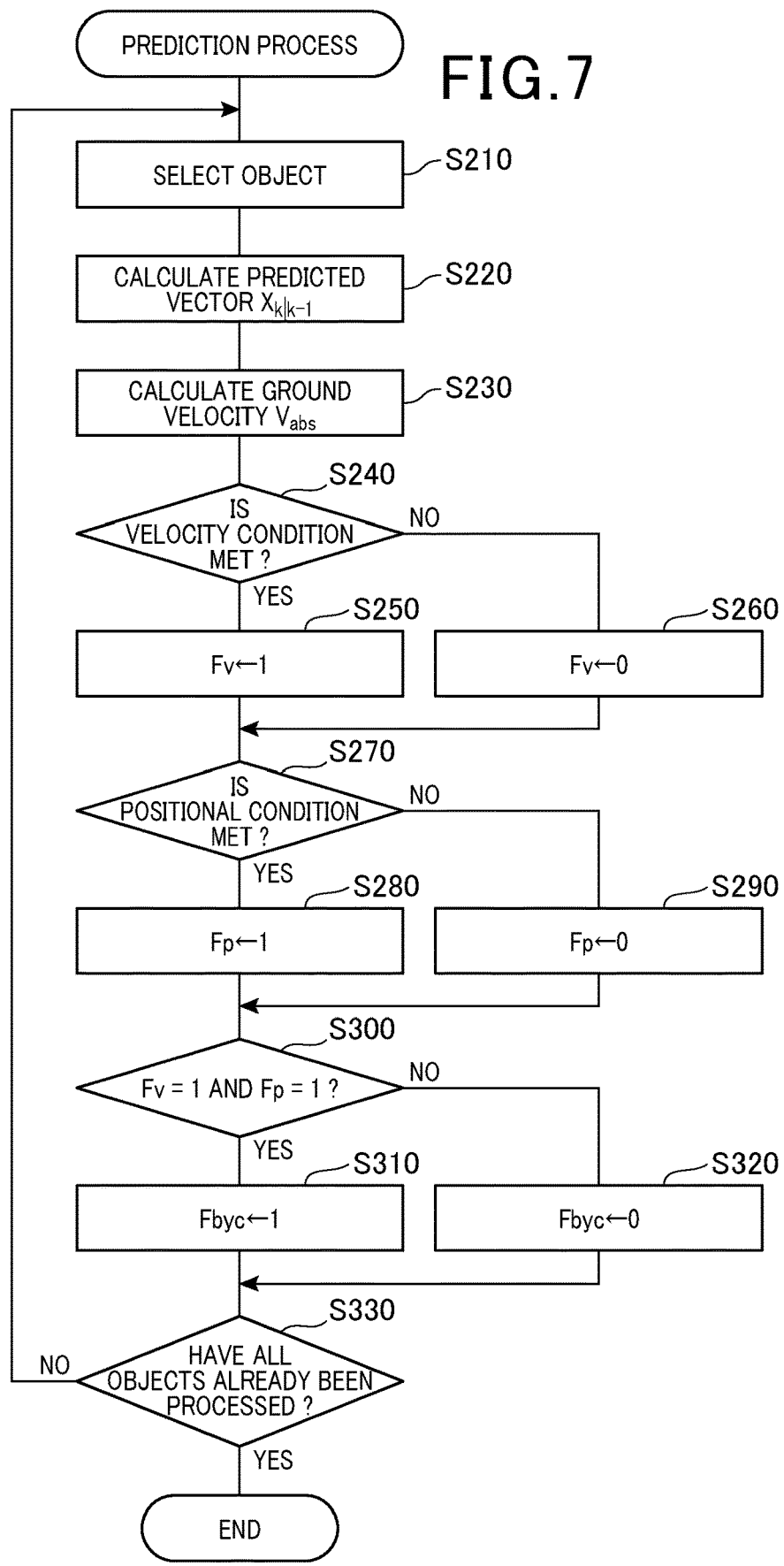
FIG. 7 is a flowchart of a prediction process.

Specifically, as illustrated in FIG. 7, in S210, the control device 10 selects one of a plurality of tracked objects as objects being tracked. Hereinafter, the selected tracked object will be called the target object.

When the previous estimated vector is designated as $X_{k-1}$ and the predicted vector as $X_{k|k-1}$, the control device 10 determines in S220 the predicted vector $X_{k|k-1}$ from the previous estimated vector $X_{k-1}$ using Equation (5) below. That is, k represents the current processing cycle and k-1 represents the previous processing cycle. In Equation (5), Vx and Vz in the second term of the right side represent values of the estimated vector $X_{k-1}$. In addition, ΔT represents the period of the processing cycle.

[Math. 3]

$$\begin{bmatrix} x \\ z \\ Vx \\ Vz \end{bmatrix}_{k|k-1} = \begin{bmatrix} x \\ z \\ Vx \\ Vz \end{bmatrix}_{k-1} + \begin{bmatrix} Vx \times \Delta T \\ Vz \times \Delta T \\ 0 \\ 0 \end{bmatrix} \quad (5)$$

In S230, based on the subject vehicle velocity Vn acquired from the vehicle velocity sensor and the lateral velocity Vx of the predicted vector $X_{k|k-1}$ determined in S220, the control device 10 calculates the ground velocity Vabs using Equation (4). As illustrated in FIG. 4, the subject vehicle velocity Vn and the ground velocity Vabs are reversed in sign.

In S240, the control device 10 determines whether the ground velocity Vabs determined in S230 meets the velocity condition, that is, whether the ground velocity Vabs takes a value within the specified velocity range stored in the memory 12. When the ground velocity Vabs meets the velocity condition, processing by the control device 10 proceeds to S250 to set a velocity condition flag Fv (that is, Fv←1), and then proceeds to S270. On the other hand, when the ground velocity Vabs does not meet the velocity condition, processing by the control device 10 proceeds to S260 to clear the velocity condition flag Fv (that is, Fv←0), and then proceeds to S270.

In S270, the control device 10 determines whether the predicted position indicated by the lateral position x and the longitudinal position z out of the predicted values determined in S220 meets the positional condition, that is, whether the predicted position falls within the specified position range stored in the memory 12. When the predicted position meets the positional condition, processing by the control device 10 proceeds to S280 to set a positional condition flag Fp (that is, Fp←1), and then proceeds to S300. On the other hand, when the predicted position does not meet the positional condition, processing by the control device 10 proceeds to S290 to clear the positional condition flag Fp (that is, Fp←0), and then proceeds to S300.

In S300, the control device 10 determines whether both the velocity condition flag Fv and the positional condition flag Fp are set. When both the flags Fv and Fp are set, processing by the control device 10 proceeds to S310 to set a bicycle flag Fbyc (that is, Fbyc←1), and then proceeds to S330. On the other hand, when at least one of the flags Fv and Fp is cleared, processing by the control device 10 proceeds to S320 to clear the bicycle flag Fbyc (that is, Fbyc←0), and then proceeds to S330.

In S330, the control device 10 determines whether S110 to S310 have been already performed on all the tracked objects. When there is any tracked object yet to be processed, the control device 10 returns to S110, and when all the tracked objects have been already processed, the control device 10 terminates this process.

Returning to FIG. 6, in S120, the control device 10 executes an associating process to associate a reflection point detected by the radar device 20 with a tracked object.

Figure 8:
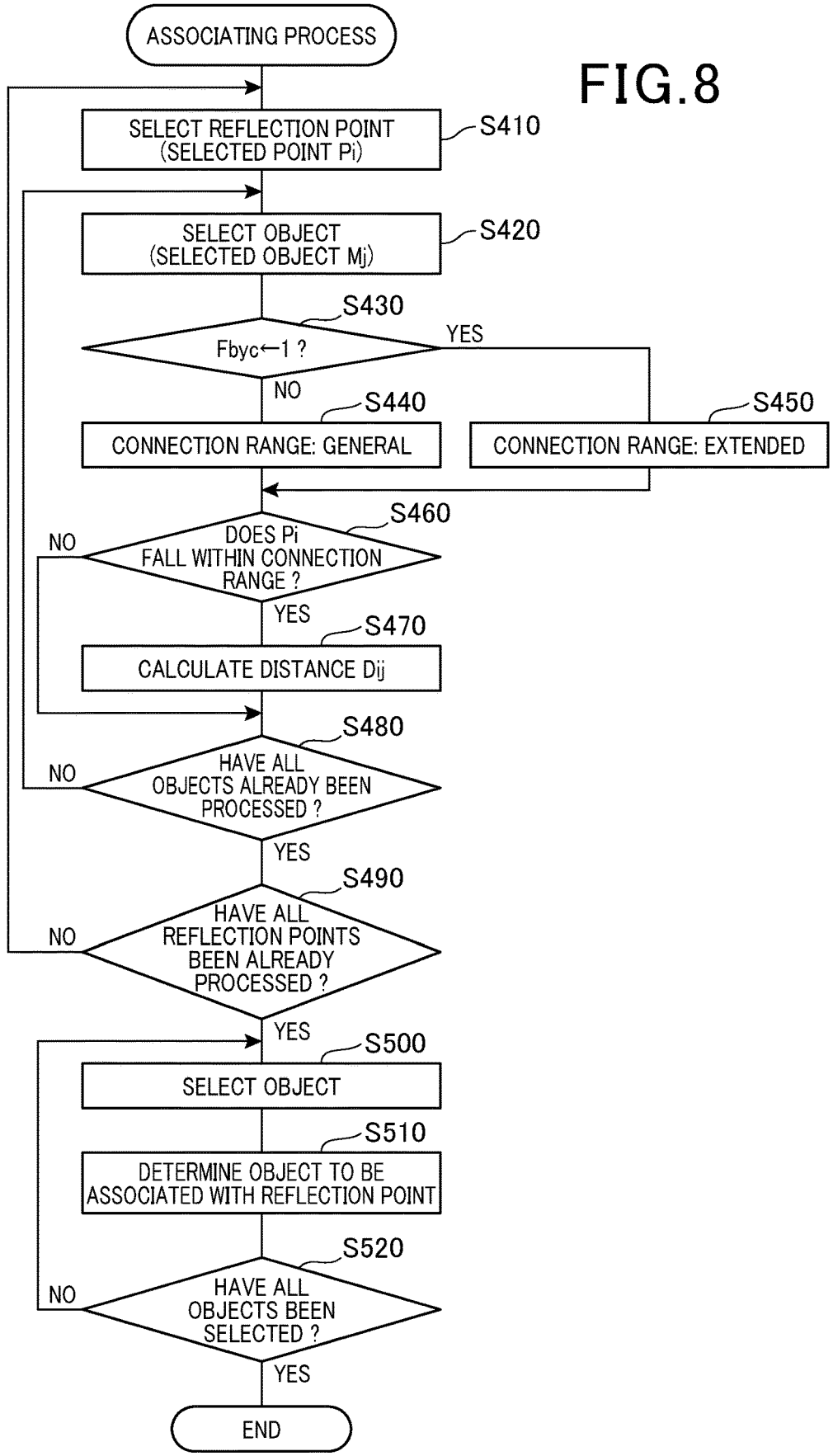
FIG. 8 is a flowchart of an associating process.

Specifically, as described in FIG. 8, in S410, the control device 10 selects any one of the plurality of reflection points detected in the current processing cycle, as selection point Pi.

In S420, the control device 10 selects any one of the plurality of tracked objects as selected object Mj.

Figure 11:
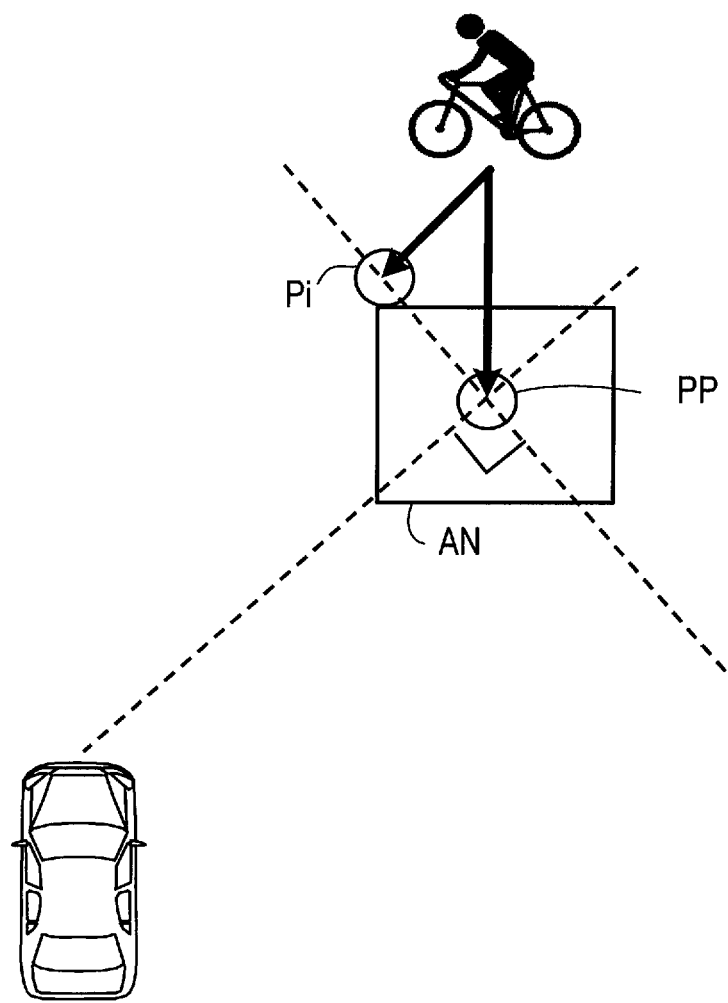
FIG. 11 is a diagram illustrating the relationship between general connection range and observation position.
Figure 12:
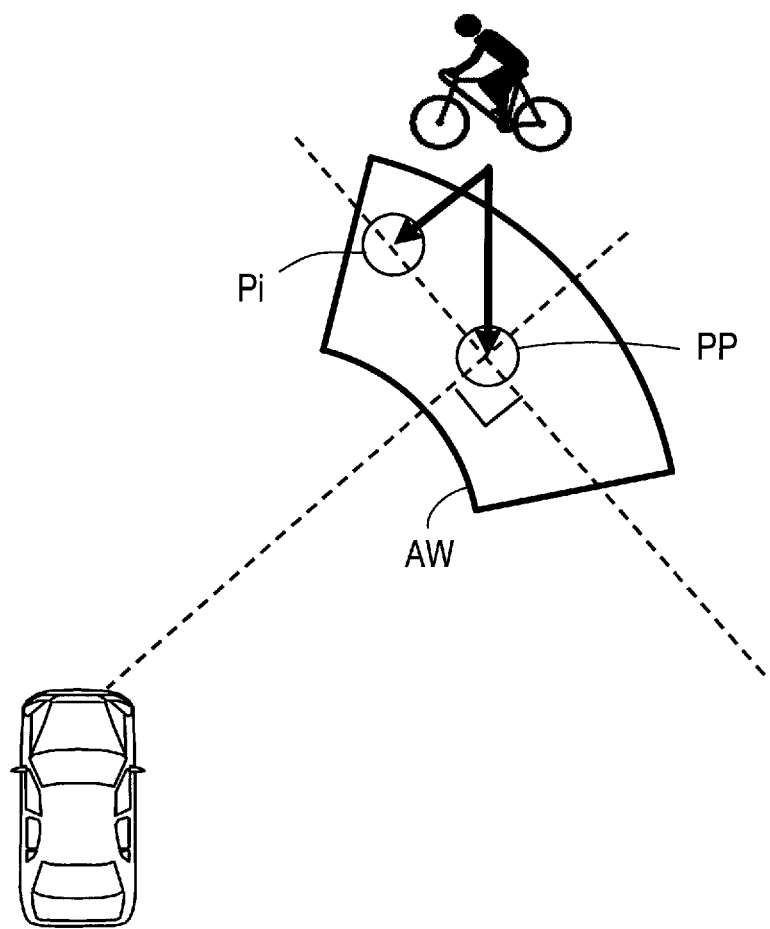
FIG. 12 is a diagram illustrating the relationship between extended connection range and observation position.

In S430, the control device 10 determines whether the bicycle flag Fbyc of the selected object Mj is set (that is, Fbyc=1). When the bicycle flag Fbyc is not set, processing by the control device 10 proceeds to S440 to set the connection range of the selected object Mj to a general connection range, and then proceeds to S460. On the other hand, when the bicycle flag Fbyc is set, processing by the control device 10 proceeds to S450 to set the connection range of the Mj to a connection range extended from the general connection range, and then proceeds to S460. A general connection range AN is a rectangular range centered on a predicted position PP as illustrated in FIG. 11. In addition, an extended connection range AW is a range that is extended in an azimuth direction as a direction orthogonal to the range direction as compared to the general connection range AN as illustrate in FIG. 12. As the direction of extension of the connection range, the connection range is extended at least in a direction moving closer to the subject vehicle with respect to the predicted position PP indicated by the lateral position x and the longitudinal position z indicated in the predicted vector $X_{k|k-1}$.

Returning to FIG. 8, in S460, the control device 10 determines whether the selected point Pi falls within the connection range of the selected object Mj set in S440 or S450. When the selected point Pi falls within the connection range, processing by the control device 10 proceeds to S470 to determine a distance Dij between the selected object Mj and the selected point Pi, and then proceeds to S480. On the other hand, when the selected point pi does not fall within the connection range, the control device 10 skips S470 and proceeds to S480.

In S480, the control device 10 determines whether S420 to S470 have been already performed on all the tracked objects. When there is any tracked object yet to be processed, the control device 10 returns to S420, and when all the previous objects have been already processed, processing by the control device 10 proceeds to S490.

In S490, the control device 10 determines whether S410 to S480 have been already performed on all the reflection points. When there is any reflection point yet to be processed, the control device 10 returns to S410, and when all the reflection points have been already processed, processing by the control device 10 proceeds to S500.

In S500, the control device 10 selects any one of the plurality of tracked objects as selected object Mj.

In S510, based on the distance Dij between the selected object Mj and the reflection point Pi falling within the connection range of the selected object Mj, the control device 10 determines whether to associate the reflection point Pi with the selected object Mj. Hereinafter, the reflection point associated with the selected object will be called associated reflection point. As a method for association, for example, when the reflection point at the shortest distance from the selected object Mj is Pi and the object at the shortest distance from the reflection point Pi is the selected object Mj, the reflection point Pi and the selected object Mj are associated with each other.

In S520, the control device 10 determines whether S500 to S510 have been already performed on all the tracked objects. When there is any tracked object yet to be processed, the control device 10 returns to S500. On the other hand, when all the tracked objects have been already processed, the control device 10 terminates this process.

Returning to FIG. 6, in S130, the control device 10 executes a deletion process to delete the tracked objects with no associated reflection point. Specifically, a deletion counter is set for each of the tracked objects so that the control device 10 resets the count value in the presence of a corresponding reflection point, and the control device 10 increments the counter value in the absence of a corresponding reflection point. Then, when the count value reaches a predetermined value, that is, when no corresponding reflection points are found in a predetermined number of consecutive processing cycles, the control device 10 deletes the tracked object.

In S140, based on observation information on the predicted vector $X_{k|k-1}$ of the tracked object and the associated reflection point associated with each other by the associating process in S120, the control device 10 executes an update process to determine an estimated value of a state vector of the tracked object in the current processing cycle (hereinafter, called current estimated vector) $X_k$.

Figure 9:
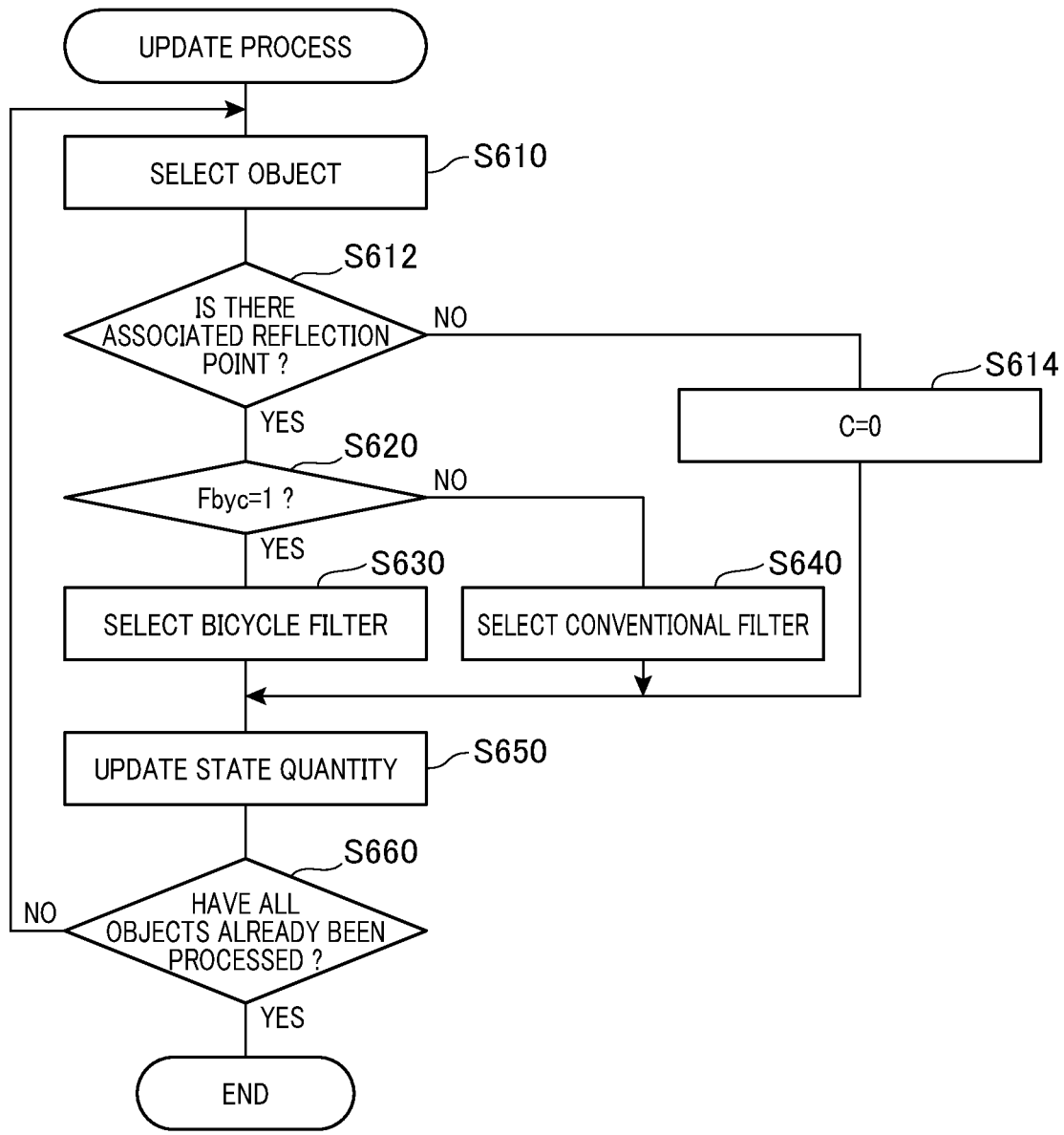
FIG. 9 is a flowchart of an update process.

Specifically, as illustrated in FIG. 9, in S610, the control device 10 selects any one of the plurality of tracked objects as the selected object.

In S612, the control device 10 determines whether the selected object has an associated reflection point. When the selected object has an associated reflection point, processing by the control device 10 proceeds to S620, and when the selected object has no associated reflection point, processing by the control device 10 proceeds to S614.

In S614, the control device 10 resets a filter coefficient matrix C to 0 and then proceeds to S650.

In S620, the control device 10 determines whether the bicycle flag Fbyc of the selected object is set. When the bicycle flag Fbyc is set, processing by the control device 10 proceeds to S630 to select a bicycle filter, and then proceeds to S650. On the other hand, when the bicycle flag Fbyc is not set, processing by the control device 10 proceeds to S640 to select a conventional filter, and then proceeds to S650. When the filter coefficient matrix is designated as C, the conventional filter is expressed by Equation (6), and the bicycle filter is expressed by Equation (7). In Equations (6) and (7), α, β1, and β2 represent feedback coefficients.

[Math. 4]

$$C = \begin{bmatrix} \alpha & 0 \\ 0 & \alpha \\ \beta 1/\Delta T & 0 \\ 0 & \beta 1/\Delta T \end{bmatrix} \quad (6)$$

$$C = \begin{bmatrix} \alpha & 0 \\ 0 & \alpha \\ \beta 1/\Delta T & 0 \\ 0 & \beta 1/\Delta T \end{bmatrix} + \beta 2/\Delta T \begin{bmatrix} 0 & 0 \\ 0 & 0 \\ 1 & -\tan\theta \\ -\tan\theta & \tan^2\theta \end{bmatrix} \quad (7)$$

In S650, the control device 10 uses the filter coefficient matrix C selected in S614, S630, or S640 to calculate the current estimated vector $X_k$ according to Equation (8). In Equation (8), xm and zm represent the lateral position and the longitudinal position determined from the observation information on the associated reflection point. In Equation (8), the first term in parentheses in the second term of the right side indicates the observed position vector. The second term in the same parentheses indicates the predicted position vector with the lateral position x and the longitudinal position x indicated in the predicted vector $X_{k|k-1}$ as elements. Hereinafter, the difference between the observed position vector and the predicted position vector will be called position vector residual.

[Math. 5]

$$\begin{bmatrix} x \\ z \\ Vx \\ Vz \end{bmatrix}_k = \begin{bmatrix} x \\ z \\ Vx \\ Vz \end{bmatrix}_{k|k-1} + C \left( \begin{bmatrix} x_m \\ z_m \end{bmatrix}_k - \begin{bmatrix} x \\ z \end{bmatrix}_{k|k-1} \right) \quad (8)$$

In S660, the control device 10 determines whether S610 to S650 have been already performed on all the tracked objects. When there is any tracked object yet to be processed, the control device 10 returns to S610. When all the tracked objects have been already processed, the control device 10 terminates this process.

Figure 13:
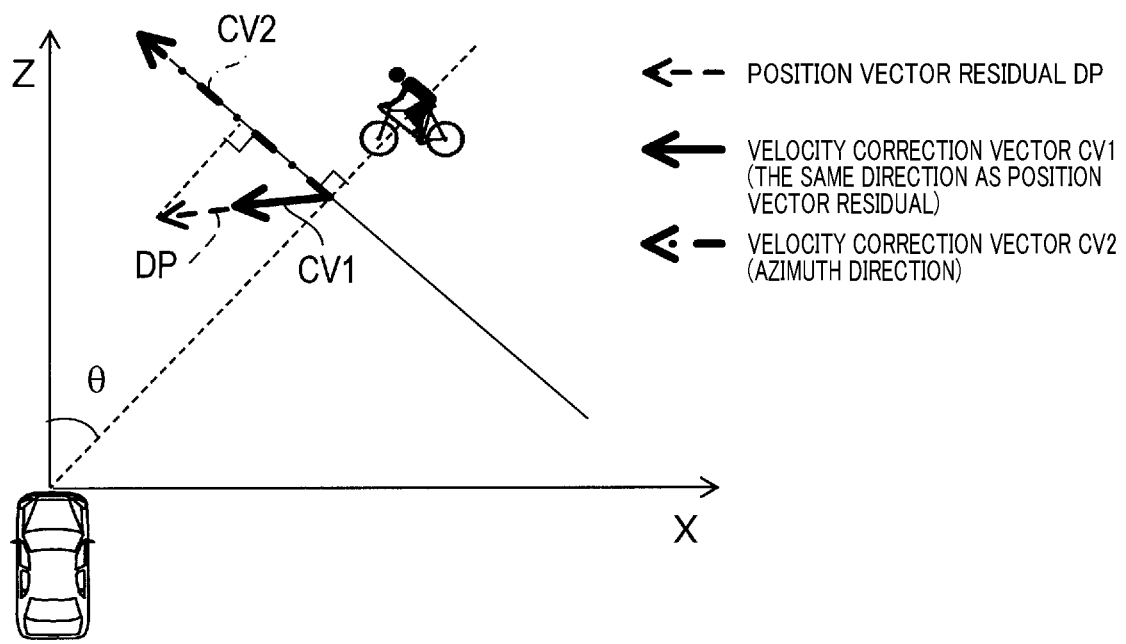
FIG. 13 is a diagram illustrating the operations of a filter.

The conventional filter indicated in Equation (6) means that a vector obtained by multiplying the length of a position vector residual DP by $\beta 1/\Delta T$ is set as a first correction vector CV1 and the first correction vector CV1 is fed back to the velocity as illustrated in FIG. 13. This filter is called an alpha-beta filter. The bicycle filter indicated in Equation (7) means that the first correction vector CV1 and a vector obtained by projecting the position vector residual DP in the azimuth direction and multiplying the length of the projected vector by $\beta 2/\Delta T$ and designated as a second correction vector CV2 are fed back to the velocity. This promotes the convergence of the lateral velocity Vx.

Figure 10:
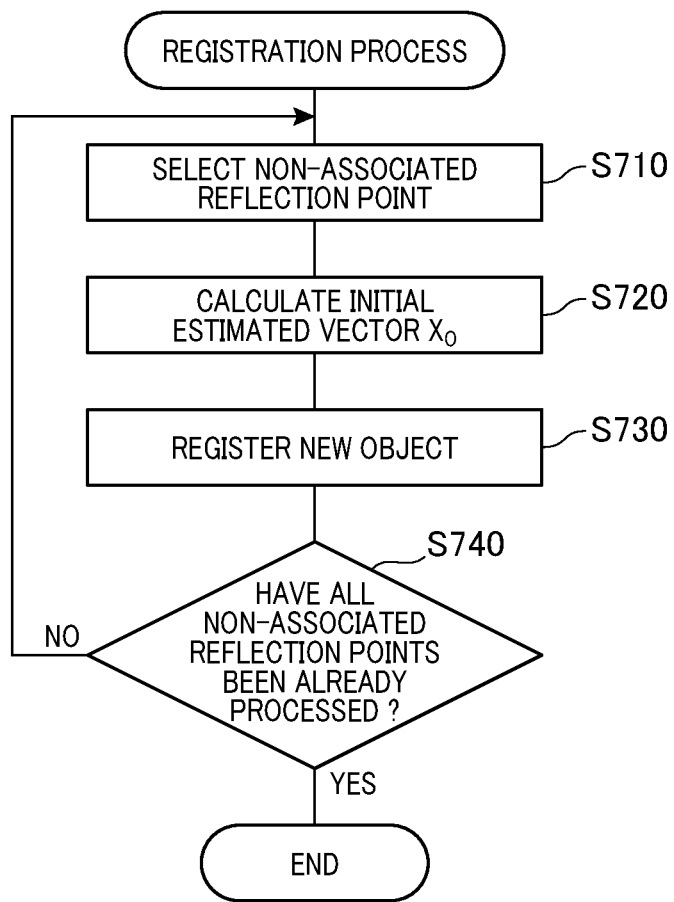
FIG. 10 is a flowchart of a registration process.

Returning to FIG. 6, in S150, the control device 10 executes a registration process to register reflection points not associated with any tracked object as new objects. Specifically, as illustrated in FIG. 10, in S710, the control device 10 selects any one of at least one reflection point not associated with any tracked object of the plurality of reflection points (hereinafter, called non-associated reflection points) detected in the current processing cycle.

In S720, the control device 10 calculates an initial value of the state vector (hereinafter, called initial estimated vector) $X_0$ from observed values r, θ, and Vr of the selected non-associated reflection point using Equation (9) below. That is, the initial value of the velocity is determined on the assumption that the lateral velocity Vx is 0.

[Math. 6]

$$\begin{bmatrix} x \\ z \\ Vx \\ Vz \end{bmatrix}_{0|0} = \begin{bmatrix} r \cdot \cos\theta \\ r \cdot \sin\theta \\ 0 \\ Vr/\cos\theta \end{bmatrix} \quad (9)$$

In S730, the control device 10 registers the selected non-associated reflection point together with the initial estimated vector $X_0$ determined in S720.

In S740, the control device 10 determines whether S710 to S730 have been already performed on all the non-associated reflection points. When there is any non-associated reflection point yet to be processed, the control device 10 returns to S710, and when all the non-associated reflection points have been already processed, the control device 10 terminates this process.

The thus determined state vector, that is, the state quantity of the object is supplied to the assist execution unit 40. The assist execution unit 40 executes various driving assist controls based on the supplied state quantity of the object.

[1-5. Advantageous Effects]

According to the first embodiment described above in detail, it is possible to produce the following advantageous effects.

(1a) In the driving assist system 1, it is determined that a tracked object meeting both the velocity condition and the positional condition is possibly a crossing bicycle and is at a position with a possibility of collision with the subject vehicle, and the connection range of the tracked object is extended in the lateral direction. Therefore, according to the driving assist system 1, it is possible to improve the accuracy of tracking of a crossing bicycle at the lateral velocity Vx higher than that of a preceding vehicle and others.

(1b) In the driving assist system 1, it is determined that a tracked object not meeting at least one of the velocity condition and the positional condition is less likely to collide with the subject vehicle even if the tracked object is a crossing bicycle, and the conventional connection range is used. Therefore, according to the driving assist system 1, it is possible to track an object at a low lateral velocity with high accuracy.

2. Second Embodiment

[2-1. Differences from the First Embodiment]

A second embodiment is identical in basic configuration to the first embodiment, and thus only differences from the first embodiment will be described below. The same reference signs as those in the first embodiment represent the same components as those in the first embodiment, and preceding descriptions will be referred to here.

In the first embodiment described above, when the tracked object meets both the velocity condition and the positional condition, the filter to be used for updating the state vector of the tracked object is changed. In contrast to this, the second embodiment is different from the first embodiment in that an extended Kalman filter is used to update in succession a Kalman gain to be used for the calculation of the estimated vector based on the observed value of the reflection point to implement the same functions as those in the first embodiment.

[2-2. Extended Kalman Filter]

The extended Kalman filter is used to handle a non-linear system and is defined by Equations (10) to (15) as follows:

[Math. 7]

$$X_{k|k-1} = f(X_{k-1}) \quad (10)$$

$$P_{k|k-1} = F_{k-1} P_{k-1} F_{k-1}^T + Q_{k-1} \quad (11)$$

$$S_k = H_k P_{k|k-1} H_k^T + R_k \quad (12)$$

$$K_k = P_{k|k-1} H_k^T S_k^{-1} \quad (13)$$

$$P_k = (I - K_k H_k) P_{k|k-1} \quad (14)$$

$$X_k = X_{k|k-1} + K_k(z_k - h(X_{k|k-1})) \quad (15)$$

where $X_{k|k-1}$ represents the predicted value of the state vector (that is, predicted vector); $X_k$ represents the estimated value of the state vector (that is, estimated vector); $z_k$ represents an observed value; $P_{k|k-1}$ represents an error variance matrix of the state vector predicted value; $P_k$ represents the estimated value of the error variance matrix; $S_k$ represents an innovation matrix; $K_k$ represents a Kalman gain; f represents a function that gives the estimated value from the previous state; h represents a function that gives the observed value; $Q_k$ represents the variance of process noise; $F_k$ represents a state transition matrix defined by Jacobian of the function f; $R_k$ represents the error variance matrix of observed noise; $H_k$ represents a conversion matrix of state vector to observation vector defined by the Jacobian of the function h; and $X_0$ represents the initial value of the state vector (that is, initial estimated vector) and $P_0$ represents the initial value of the error variance matrix.

[2-3. Processes]

The state quantity prediction process is identical to that in the first embodiment except that, in S220 of the flowchart described in FIG. 7, the predicted vector $X_{k|k-1}$ and the error variance matrix $P_{k|k-1}$ are determined by Equations (10) and (11).

The associating process is identical to that in the first embodiment except that, in S470 of the flowchart described in FIG. 8, the innovation matrix $S_k$ is determined by Equation (12), and a Mahalanobis distance is determined as distance Dij based on the innovation matrix $S_k$.

The state quantity update process is identical to that in the first embodiment except that S620 to S640 of the flowchart described in FIG. 9 are omitted, and in S650, the Kalman gain $K_k$, the estimated value $P_k$ of the error variance matrix, and the estimated vector $x_k$ are determined by Equations (13) to (15).

Figure 14:
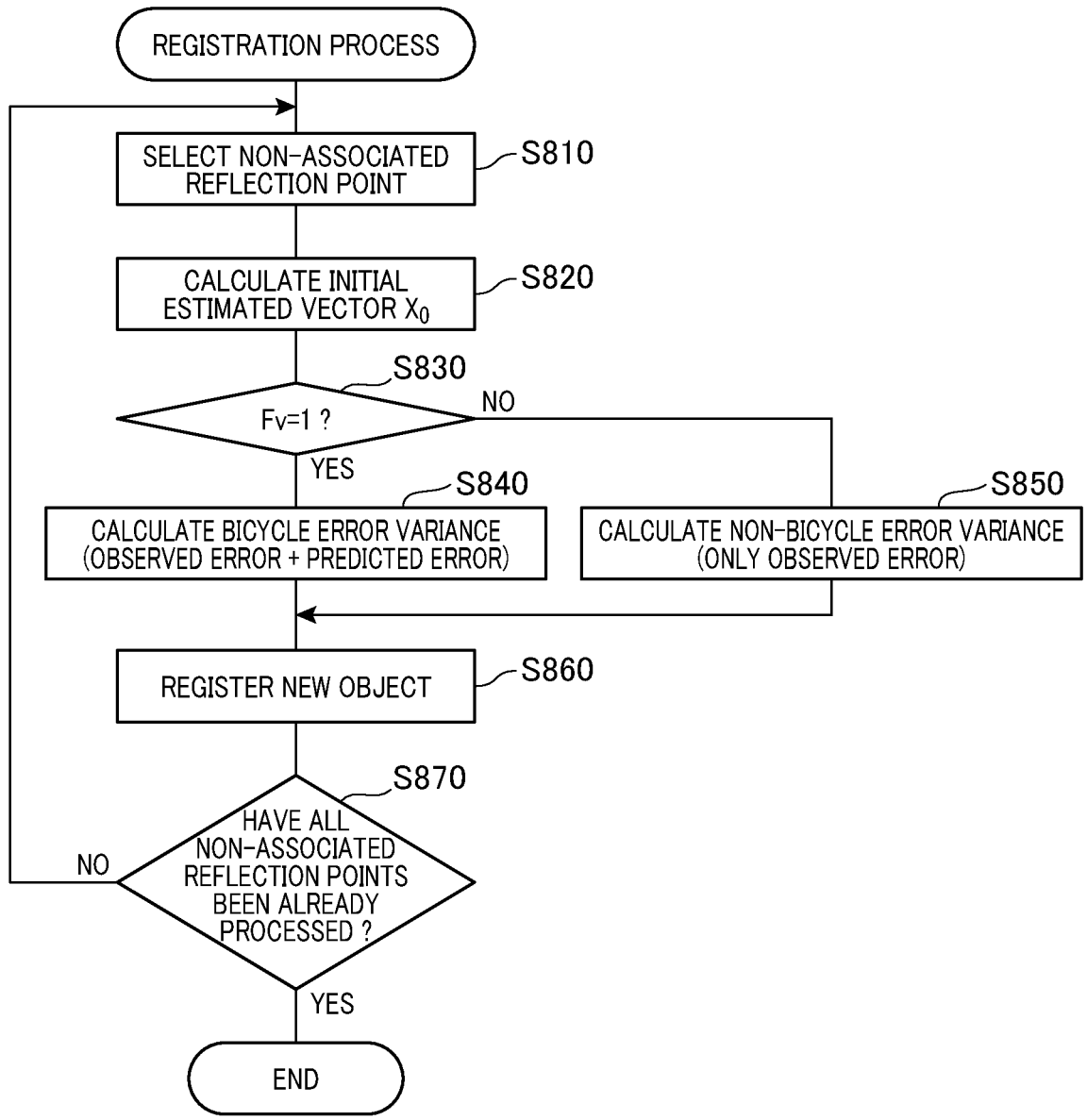
FIG. 14 is a flowchart of a registration process in a second embodiment.

The new registration process is performed according to the flowchart described in FIG. 14 instead of the flowchart described in FIG. 10.

In S810, the control device 10 first selects any one of a plurality of reflection points that is detected in the current processing cycle and is not associated with any tracked object (hereinafter, non-associated reflection points).

In S820, the control device 10 calculates the initial estimated vector $X_0$ according to Equation (9) from the observed values r, 0, and Vr of the selected non-associated reflection point.

In S830, the control device 10 determines whether the velocity condition flag Fv is set (that is, Fv=1). When the velocity condition flag Fv is set, processing by the control device 10 proceeds to S840 to determine the initial value $P_0$ of the error variance matrix according to Equation (16), and then proceeds to S860. On the other hand, when the velocity condition flag Fv is not set, processing by the control device 10 proceeds to S850 to determine the initial value $P_0$ of the error variance matrix according to Equation (17), and then proceeds to S860.

[Math. 8]

$$P_0 = \begin{bmatrix} \sigma_x^2 & 0 & 0 & 0 \\ 0 & \sigma_z^2 & 0 & 0 \\ 0 & 0 & \sigma_{vx}^2 & -\sigma_{vx}^2 \tan\theta \\ 0 & 0 & -\sigma_{vx}^2 \tan\theta & \sigma_{vx}^2 \tan^2\theta \end{bmatrix} \quad (16)$$

$$P_0 = \begin{bmatrix} \sigma_x^2 & 0 & 0 & 0 \\ 0 & \sigma_z^2 & 0 & 0 \\ 0 & 0 & \sigma_{vx}^2 & 0 \\ 0 & 0 & 0 & \sigma_{vx}^2 \end{bmatrix} \quad (17)$$

where σx represents a standard deviation of lateral observed position error; σz represents a standard deviation of longitudinal observed position error; and σvx represents a standard deviation of lateral velocity. These deviations σx, σz, and σvx take constants based on actually measured errors. In Equation (16), σvx may be defined by Equation (18) based on the calculation formula for the ground velocity Vabs described in Equation (4), for example. Accordingly, the convergence of the lateral velocity to the crossing object can be accelerated.

[Math. 9]

$$\sigma_{vx} = \sqrt{Vabs \cdot Vn} \quad (18)$$

In S860, the control device 10 registers the non-associated reflection point selected in S810 as a new object together with the initial estimated vector $X_0$ determined in S820 and the initial value $P_0$ of the error variance matrix determined in S840 or S850.

In S870, the control device 10 determines whether S810 to S860 have been already performed on all the non-associated reflection points. When there is any non-associated reflection point yet to be processed, the control device 10 returns to S810, and when all the non-associated reflection points have been already processed, the control device 10 terminates this process.

Figure 15:
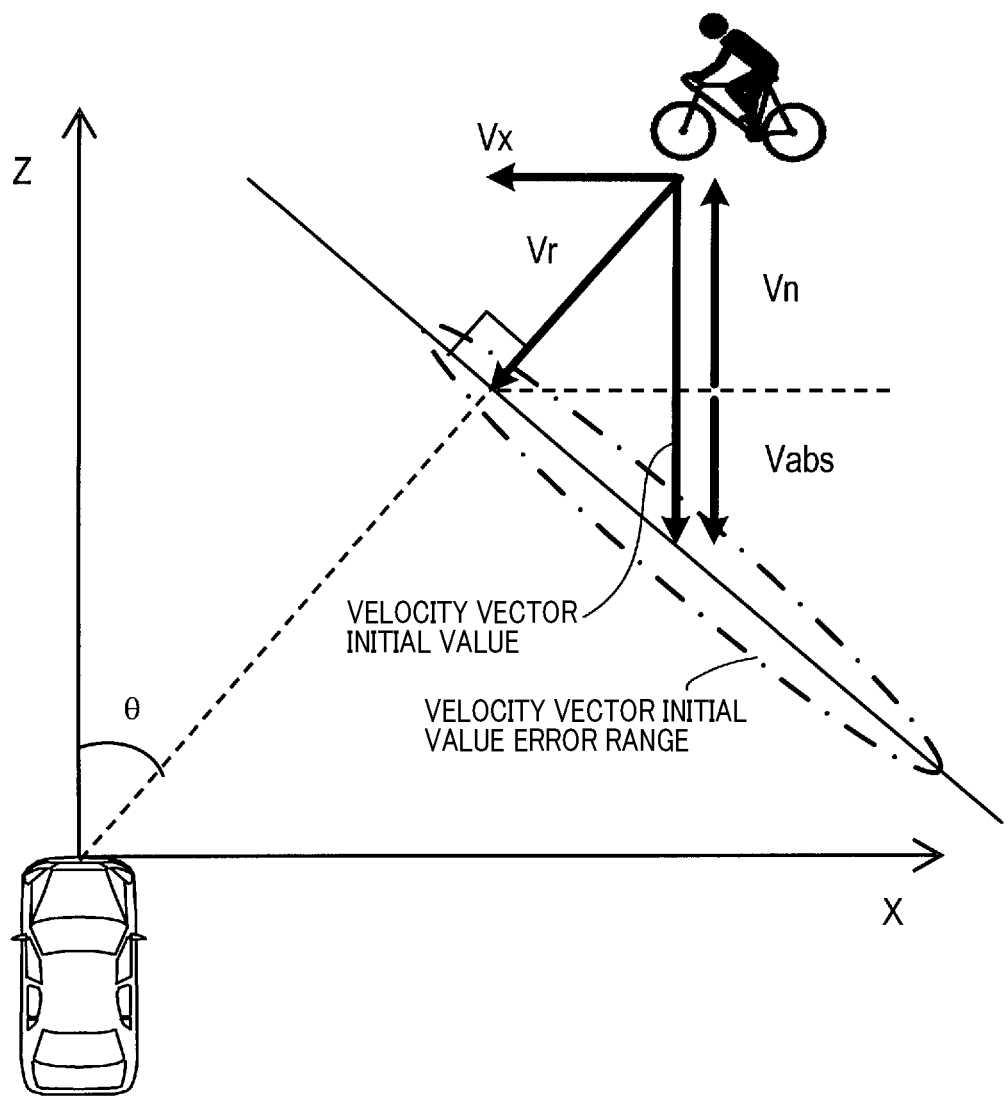
FIG. 15 is a diagram illustrating the meaning of initial settings of an error variance matrix used in an extended Kalman filter.

The error variance matrix described in Equation (16) set when the velocity condition flag Fv is set, in particular, the four right lower elements express that the velocity vector initially set with the lateral velocity Vx=0 has an error within an oval region indicated by a one-dot chain line in FIG. 15.

[2-4. Advantageous Effects]

According to the second embodiment described above in detail, the advantageous effects (1a) and (1b) of the first embodiment can be obtained.

3. Other Embodiments

Embodiments of the present disclosure have been described so far. However, the present disclosure is not limited to the foregoing embodiments but can be modified in various manners.

(3a) In the foregoing embodiments, a crossing bicycle is detected as a target object, but the present disclosure is not limited to this. When an object other than a crossing bicycle is set as a target object, the specified velocity range and the specified position range can be set as appropriate according to the possible velocity range of the object.

(3b) In the foregoing embodiments, when the bicycle flag Fbyc is on, the connection range of the tracked object is extended without exception, but the present disclosure is not limited to this. For example, the extension rate of the connection range may be changed according to the magnitude of the lateral velocity Vx of the tracked object.

(3c) In the foregoing embodiments, the bicycle flag Fbyc of an object is set when the object meets both the velocity condition and the positional condition. Alternatively, the bicycle flag Fbyc may be set when the object meets at least the positional condition.

(3d) A plurality of functions of one component in the foregoing embodiments may be implemented by a plurality of components, or one function of one component may be implemented by a plurality of components. In addition, a plurality of functions of a plurality of components may be implemented by one component, or one function implemented by a plurality of components may be implemented by one component. Some of the components of the foregoing embodiments may be omitted. At least some of the components of the foregoing embodiments may be added to or replaced with other components of the foregoing embodiments. Any mode included in the technical idea specified by the descriptions in the claims constitutes an embodiment of the present disclosure.

(3e) Besides the object detection device described above (that is, the control device 10 in the driving assist system 1), the present disclosure can be implemented in various modes such as a system having the object detection device as a component, a program for causing a computer to serve as the object detection device, a non-transitory tangible recording medium such as a semiconductor memory storing the program, and an object detection method.

The invention claimed is:

1. An object detection device that, based on a state quantity indicating at least one of position and velocity of a reflection point of a radar wave emitted from and detected by a radar device, determines a state quantity of at least one or more objects having reflected the radar wave in each of preset processing cycles, comprising:
   a range setting unit configured to, out of the at least one or more objects, for each of at least one or more tracked objects as objects being tracked, set a connection range of the radar device as a range within which an individual tracked object is detectable based on a previous state quantity as a state quantity of the individual tracked object determined in a previous processing cycle;
   an association extraction unit configured to, for each of the at least one or more tracked objects, extract the reflection point detected by the radar device in a current processing cycle and located in the connection range set by the range setting unit as an associated reflection point; and
   a state quantity update unit configured to, for each of the at least one or more tracked objects, update the state quantity of each of the at least one or more tracked objects in the current processing cycle, based on the previous state quantity and the state quantity of the associated reflection point extracted by the association extraction unit, characterized in that
   the range setting unit is configured to determine whether each of the at least one or more tracked objects meets a positional condition, and when determining that the positional condition is met, extend the connection range of the radar device as compared to when determining that the positional condition is not met,
   the positional condition is that the at least one or more tracked objects fall within a specified position range,
   the specified position range is a range in which a specified target object is estimated to collide with a subject vehicle when the target object moves in a lateral direction as a direction along a width of the subject vehicle at a velocity within a possible velocity range of the target object, and
   the subject vehicle is a vehicle equipped with the object detection device, wherein
   the specified position range is set within a range defined by a first angle $\theta 1$ and a second angle $\theta 2$ in which an angle of an azimuth direction with reference to a traveling direction of the subject vehicle is determined based on the first angle and the second angle, and
   the first angle $\theta 1$ and the second angle $\theta 2$ are determined based on a velocity of the subject vehicle Vn, a predetermined lower limit velocity Vx1 of the velocity range of the target object in the lateral direction, and a predetermined upper limit velocity Vx2 of the velocity range of the target object in the lateral direction.

2. The object detection device according to claim 1, wherein
   the angle of the azimuth direction with reference to the traveling direction of the subject vehicle is defined by equations as follows:

$\theta 1 = \arctan(Vx1/Vn)$ $\theta 2 = \arctan(Vx2/Vn)$.

3. The object detection device according to claim 1, wherein
   the specified position range is limited such that a time to collide with the target object moving in the lateral direction falls within a preset time range.

4. The object detection device according to claim 1, wherein
   the range setting unit is configured to, for each of the at least one or more tracked objects, determine whether both the positional condition and a velocity condition are met, and when determining that both the positional condition and the velocity condition are met, extend the connection range as compared to when determining that at least one of the positional condition and the velocity condition is not met,
   the velocity condition is that a ground velocity determined from the state quantity of the tracked object falls within a specified velocity range,
   the specified velocity range is a possible range of the ground velocity of the target object moving in the lateral direction,
   the ground velocity is a velocity obtained by subtracting the velocity of the subject vehicle from a longitudinal velocity determined on an assumption that a lateral velocity of the tracked object is zero,
   the lateral velocity is a velocity along the lateral direction, and
   the longitudinal velocity is a velocity along the traveling direction of the subject vehicle.

5. The object detection device according to claim 1, wherein
   the state quantity update unit is configured to, when the connection range is extended by the range setting unit, update the state quantity by using a filter for accelerating convergence of the velocity in the lateral direction.

6. The object detection device according to claim 1, wherein
   the state quantity update unit is configured to update the state quantity by using an extended Kalman filter in which a component for accelerating convergence of the velocity in the lateral direction is used in an error variance matrix.

7. The object detection device according to claim 1, wherein the target object is a bicycle.

* * * * *